2 Sheets—Sheet 2.

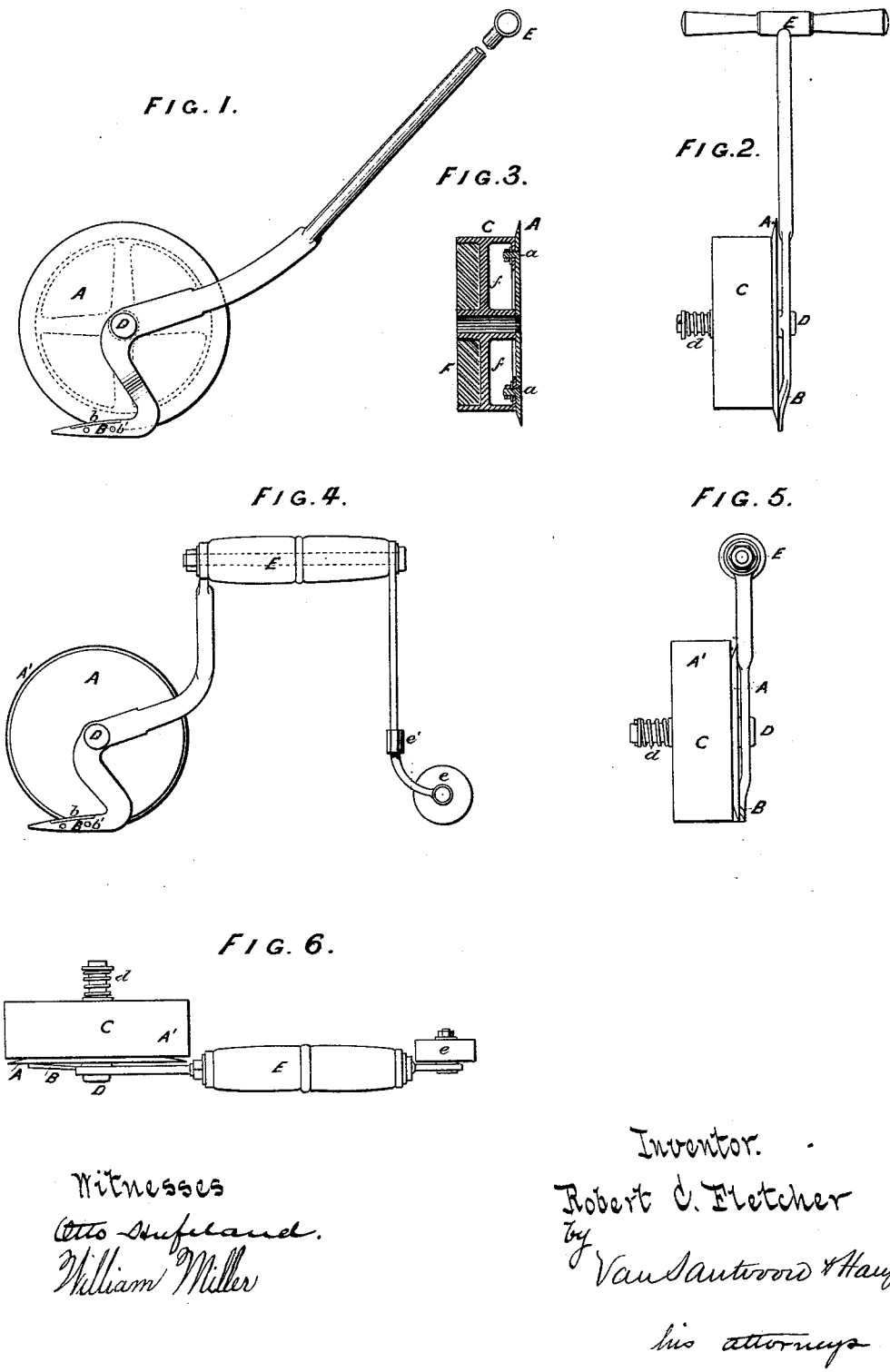

R. C. FLETCHER.
Cutter for Grass, Paper, &c.

No. 218,511. Patented Aug. 12, 1879.

Witnesses
Otto Hufeland
William Miller

Inventor.
Robert C. Fletcher
by
Van Santvoord & Hauff
his attorneys

UNITED STATES PATENT OFFICE.

ROBERT C. FLETCHER, OF TARLETON, COUNTY OF LANCASTER, ENGLAND.

IMPROVEMENT IN CUTTERS FOR GRASS, PAPER, &c.

Specification forming part of Letters Patent No. 218,511, dated August 12, 1879; application filed June 19, 1879.

*To all whom it may concern:*

Be it known that I, ROBERT CROMPTON FLETCHER, of Tarleton, Lancashire, England, have invented a new and useful Improved Shears, which is fully set forth and described in the following specification.

The invention relates to shears for cutting grass borders or edges, and also materials of a flat nature, such as cloth, paper, canvas, leather, or any other substances which the improved shears can travel on and cut.

The invention consists in the arrangement of a stationary under cutter and a circular and revoluble upper cutter attached to a carrying drum or roller, to the axis of which the stationary cutter-holder is attached.

Figure 7:
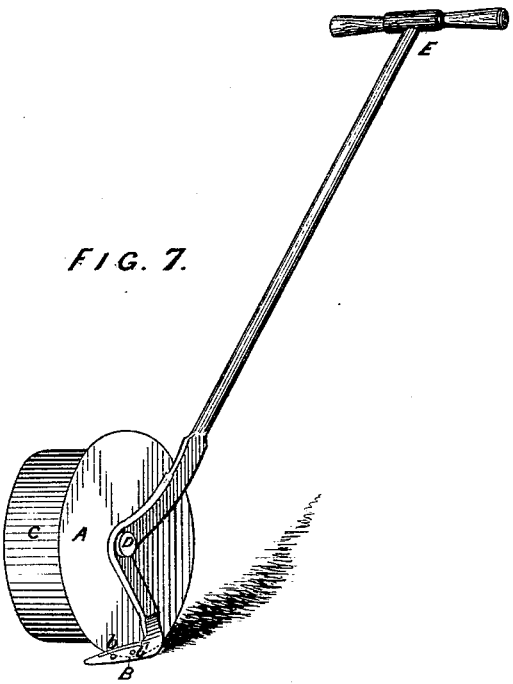
Figure 8:
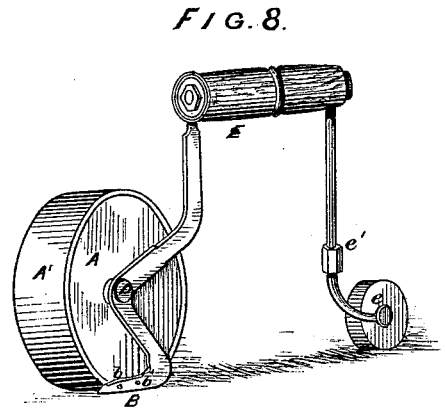

In the accompanying drawings, in which similar letters of reference indicate like parts, Figure 7 is a perspective view of a device embodying the invention, and intended for cutting grass or other borders; and Fig. 8 is a perspective view of a modification intended for cutting cloth and any other flat or suitable material. Fig. 1 is a side elevation, and Fig. 2 a front view, of Fig. 7; and Fig. 3, cross-section of drum and circular cutter. Fig. 4 is a side elevation, Fig. 5 front view, and Fig. 6 plan, of Fig. 8.

A is the circular cutter; A', rubber or compressible ring; B, stationary cutter; C, drum; D, axle-pin; E, handle; F, wood packing; a, bolts fixing circular cutter in place; b, detachable cutter in stationary cutter-holder; b', pins or rivets for fixing b; d, spring for keeping stationary and revoluble cutter contiguous; e, caster; e', swivel-joint; f, spokes of drum.

The shears for cutting borders has the cutter A deeper than the traveling drum C, while the shears for cutting flat and comparatively thin material has its cutter A almost the same depth as the drum C when furnished with a compressible or yielding periphery.

The operation is somewhat similar to that of shears or scissors generally. In the case of the border-cutting machine it should be pushed before one, and in the modification for cutting cloth, &c., the hand must press while pushing on the horizontal handle E.

I would remark that the periphery of either modification can be formed with small corrugations or dentations thereon or checkered.

Heretofore a machine for trimming vines, &c., has been constructed of a rotary cutting-blade provided with a pinion, which meshes with an internal gear-wheel within a traction-wheel, which rolls on the ground, and thereby imparts a rotary motion to the rotary cutter, which latter operates in connection with the edge of a stationary blade. Such construction of machine, not being my invention, is hereby disclaimed.

What I claim is—

The combination, with a traveling drum or cylinder provided with suitable propelling-handles, of a circular cutting-blade rigidly connected directly to one end of the drum or cylinder, and a stationary cutting-blade arranged to operate in conjunction with the circular rotary cutter, substantially as described.

In testimony whereof I have signed this specification in the presence of two subscribing witnesses.

ROBERT C. FLETCHER.

Witnesses:
THOS. SELDEN,
ROBERT MCCONNELL.